Sept. 29, 1970     W. H. PLUMPE, JR     3,531,703
AC MOTOR SPEED CONTROL SYSTEM
Filed March 4, 1968     2 Sheets-Sheet 1
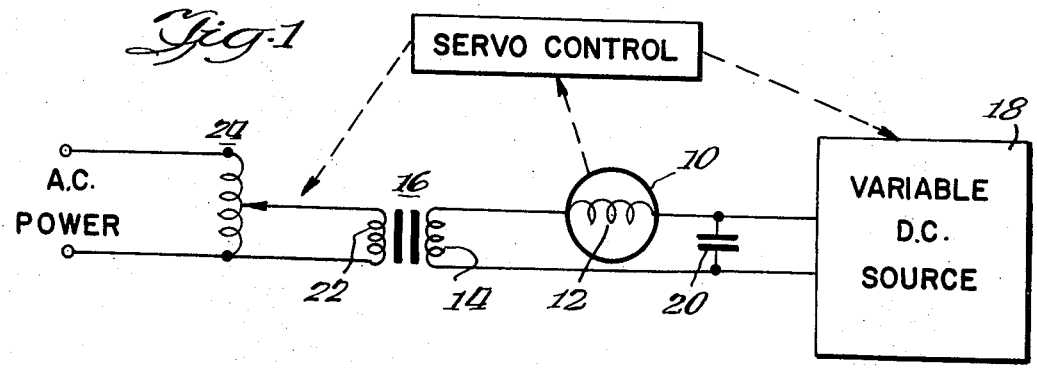
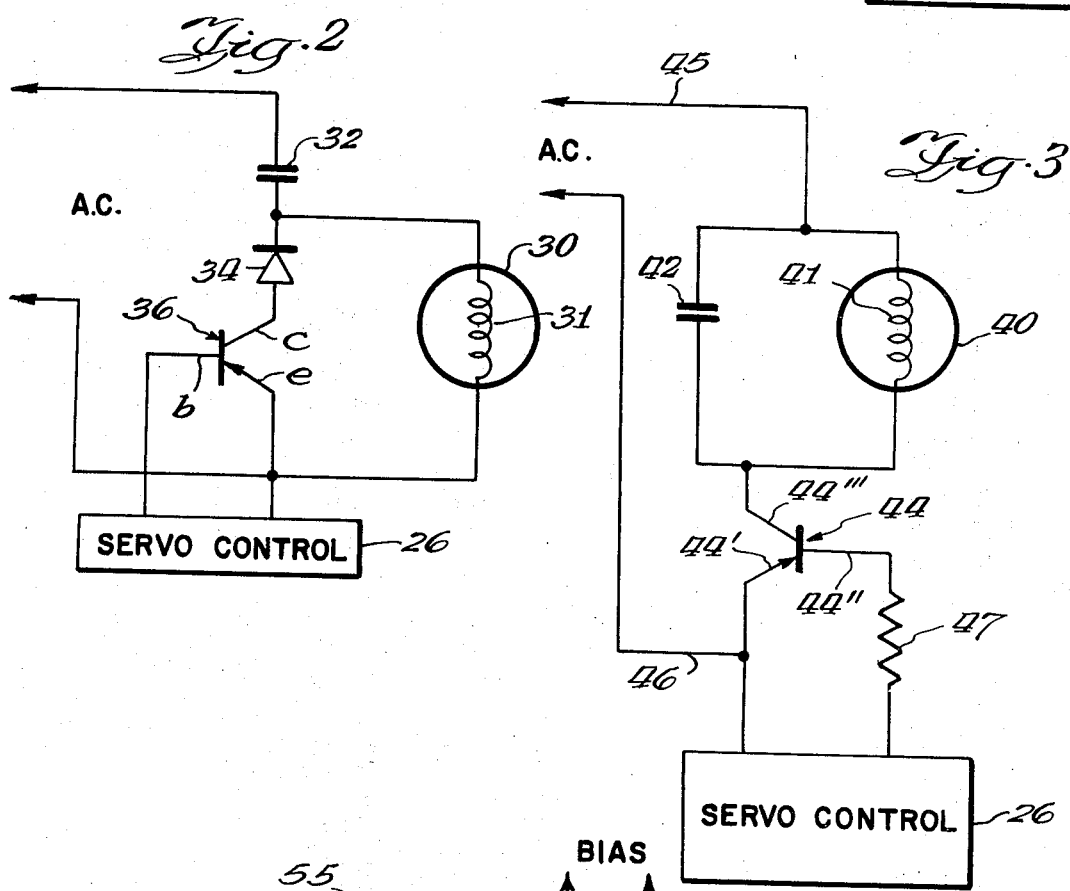
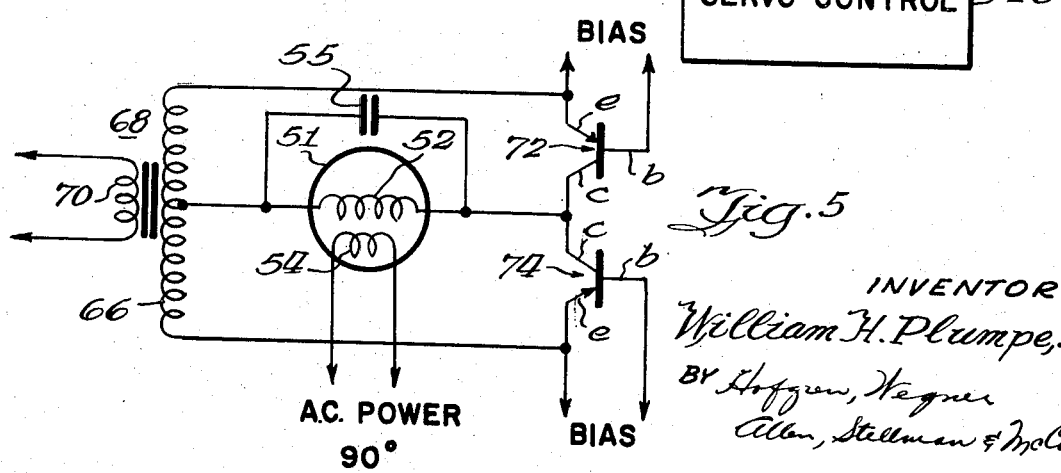
INVENTOR
William H. Plumpe, Jr.
BY Hofgren, Wegner
Allen, Stellman & McCord
ATTORNEYS

United States Patent Office 3,531,703
Patented Sept. 29, 1970

3,531,703
AC MOTOR SPEED CONTROL SYSTEM
William H. Plumpe, Jr., St. Louis, Mo., assignor to Sherwood Medical Industries, Inc., a corporation of Delaware
Filed Mar. 4, 1968, Ser. No. 710,100
Int. Cl. H02p 1/40
U.S. Cl. 318—203                    5 Claims

ABSTRACT OF THE DISCLOSURE

A transistor, having a base electrode, and emitter and collector electrodes which will function as collector and emitter electrodes respectively when opposite polarity voltage is coupled thereacross, is connected with a biasing networn to pass an AC waveform in which the amplitude of one half cycle can be controlled independent of the other half cycle. The transistor circuit is connected with an AC motor to achieve continuous speed control by introducing a variable ratio of AC/DC across the AC motor.

---

This invention relates to a semiconductor control circuit, and more particularly to a semiconductor circuit for passing varying amounts of AC and DC voltages. The circuit is especially adaptable for controlling the speed of an AC motor.

Prior control systems have controlled the speed of an AC motor below full speed by introducing a direct current component into an alternating current applied across the motor field winding. By selectively varying the AC/DC ratio, all intermediate speeds may be readily selected. Such a control system is vastly superior to mechanical speed control devices which waste power and cause attendant wear and maintenance problems.

However, such motor speed controls using the principle of direct current insertion into an AC waveform have not gained an acceptance commensurate with the theoretical advantages of the system, due to the complexity of their circuits. Furthermore, the response time of prior circuits is slow, hence extremely fine speed control, such as that required in servo systems, is difficult to achieve.

The applicant has provided a novel semiconductor control circuit which passes varying amounts of AC and DC voltages. This circuit is especially adaptable for precisely controlling the speed of an AC motor, to produce a simple and effective motor speed control responsive to small amplitude control signals, such as found in servo systems.

One object of this invention is the provision of a novel semiconductor control circuit having an output that includes both alternating current and direct current components which may be varied in amplitude.

Another object of this invention is the provision of an improved motor speed control system using a semiconductor circuit for introducing a direct current component into an alternating current waveform. The AC/DC ratio may be varied such that the motor may be run at full speed, braked to a halt, or run at any intermediate speed.

One feature of this invention is the provision of a single transistor circuit usable as an AC/DC control having an output adjustable between a pure AC voltage, a pure DC voltage, and any intermediate ratio of AC/DC voltages, or usable as an AC switch for passing varying amplitudes of one or both half cycles of an AC waveform.

Another feature of this invention is the provision of a motor speed control system wherein a transistor of a type wherein the emitter may act as a collector and vice versa is used to introduce a direct current component into an alternating current waveform.

Still another feature of this invention is the provision of a motor speed control system whereby a bidirectional AC motor may be braked in either direction and its speed controlled in either direction.

Other objects and advantages of the invention will become apparent from the following specification and the drawings, in which:

FIG. 1 is a schematic diagram of a motor speed control using the principle of DC insertion into an AC voltage;

FIG. 2 is a schematic diagram of a semiconductor circuit in accordance with the principles of the invention, illustrated in a motor speed control system;

FIG. 3 is a schematic diagram of another modification of the invention, in which a single transistor has a varying AC and DC output;

Figure 4:
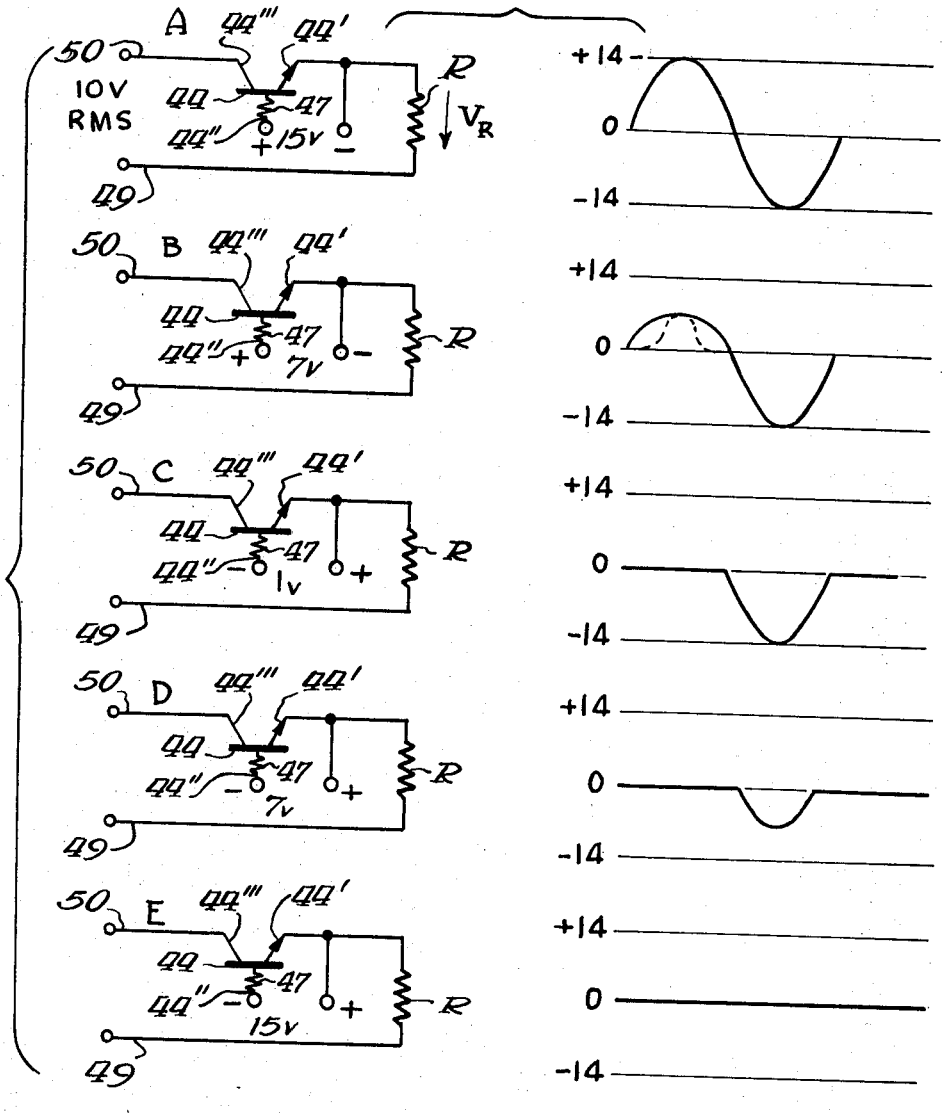

FIGS. 4A–E show the single transistor circuit of FIG. 3 in a simplified form, and the voltage waveforms across the load thereof for several values of bias applied to the transistor; and FIG. 5 is a schematic diagram of still another modification of the invention for controlling a bidirectional motor.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. Throughout the specification, values and type designations will be given for certain of the components in order to disclose a complete, operative embodiment of the invention. However, it should be understood that such values and type designations are merely representative and are not critical unless specifically so stated.

In a conventional alternating current motor control system, when the alternating current voltage is impressed upon a motor, the motor will not turn until the starting torque of the motor exceeds the breakaway friction of the bearings. Many servo systems utilize gears, potentiometers, etc. connected to the motor and the breakaway friction in such systems may be of such a level that relatively high AC voltage must be impressed before the motor will begin to turn. Once the breakaway friction has been overcome, the motor will tend to rapidly accelerate to its synchronous speed, giving very poor control at the most critical point, near null.

In accordance with the instant invention, an improved semiconductor control is used to apply a DC component mixed with an AC component to an alternating current motor. Other uses for the semiconductor control will be described later. When the motor is stalled or heavily loaded, the AC produces a torque which is nearly independent of the speed of the motor until the motor reaches approximately one half speed or higher. The braking action from the DC component is proportional to the speed. Therefore, for a given ratio of AC/DC there is a particular motor speed where the torque and the braking action are in equilibrium. This speed is rather sharply defined by the AC/DC ratio and maintains the motor speed at a constant value since if the motor increases or decreases speed slightly, the braking action increases or decreases immediately and the motor regains its selected speed. When the invention is used in a servo system, the speed control is the equivalent of a continuously variable viscous damper attached to the motor shaft, in which the drag of the damper can be made very large compared to the frictional drag from various potentiometers and attached indicating devices. Therefore, minor variations in the friction of the gear trains associated with the servo mechanism have very little effect on the speed of the motor.

An AC/DC motor speed control circuit in a broad sense is shown in FIG. 1, and comprises a conventional shaded pole motor 10 having a field winding 12. The field winding 12 is placed in series with the secondary coil 14 of a transformer 16 which has an AC output. Additionally, an adjustable direct current supply 18 is placed in series with the secondary coil 14 and the field winding 12. In order to provide an alternating current path between the secondary coil 14 and the field winding 12, a capacitor 20, which may have a value of 5000 microfarads, is arranged in parallel with the direct current source 18. Transformer 16 has a primary coil 22 which is connected to a variable transformer 24 such as a variable autotransformer currently marked under the trademark "Variac." The autotransformer 24 may be connected to a conventional source of alternating current.

In operation, the autotransformer 24 may be adjusted to provide any desirable amplitude of AV voltage to transformer 16 and thence to the field winding 12 of the motor 10. The direct current component is inserted into the AC voltage across motor 10. By suitable adjustment of the autotransformer 24 and the direct current supply 18, any desired AC/DC ratio may be obtained. As is known, the AC serves to drive the motor to full speed, while the DC component serves to brake the motor. By adjusting the ratio of AC/DC, any desired speed can be maintained.

When it is desired to use the motor speed control in connection with a servo system, a servo control 26 may be arranged to progressively reduce the DC component as the system progresses away from the null point thereof. If the servo motor is of the type which is partly speed controllable by the amplitude of AC applied thereto, the servo control 26 may also be arranged to control the output of autotransformer 24.

A semiconductor circuit in accordance with the present invention, and embodied in a motor speed control which operates on the theory described above, is shown in FIG. 2. The circuit includes an alternating current motor 30 having a field winding 31 in series with a capacitor 32 and connected across an alternating current source. The motor 30 is shunted by the serial arrangement of a diode 34 and a controllable semiconductor device, as a transistor 36. In this arrangement, the AC/DC ratio is determined by the value of the impedance in the circuit branch comprising the diode 34 and the transistor 36. By suitable bias control of the transistor 36 between saturation and cut off, the unidirectional impedance of the circuit branch may be regulated to control the AC/DC ratio. Typically, a bias control signal may be applied to the base $b$ and emitter $e$ of the transistor 36 by any suitable source such as a feedback potentiometer in the servo control 26.

When transistor 36 is driven into saturation, one half cycle of the alternating current component otherwise applied to the motor is removed, and the resulting pulsating DC component (the other half cycle of AC) maintains the motor at rest. When it is desired to start the motor as, for example, when a correction is required in the servo system, a bias control signal is applied to the transistor 36 which drives the transistor out of saturation and into a less conductive state, allowing part of the previously shorted half cycle of AC to flow through the motor winding. The motor now turns at a speed generally proportional to the magnitude of the bias control signal which, in turn, may be controlled by the magnitude of the error in the servo system. When the transistor is driven into cut off by the bias conrol signal, the motor 30 attains full speed.

In FIG. 3, a single transistor circuit is illustrated which develops a variable AC and DC voltage output by utilizing known peculiarities of certain transistors in a unique manner. This circuit is illustrated in a motor control system which includes an alternating current motor 40 having a field winding 41 shunted by a capacitor 42 of relatively small value. Other uses for the circuit will be described later.

A single transistor 44, having an emitter electrode 44', a base electrode 44'', and a collector electrode 44''', is placed in series with the paralleled motor 40 and capacitor 42 and is connected through lines 45, 46 to a source of alternating current. A control signal or bias is placed across the emitter electrode 44' and the control or base electrode 44'' thereof, which has a resistor 47 inserted therein to prevent excess base current.

In this embodiment of the invention, the transistor 44, which may for example be a PNP type 2N441, acts as an AC switch capable of modifying an AC waveform to produce a variable AC short which also may insert a variable DC component into the AC waveform. It has been observed by some experimentors that many transistors, including a 2N441 transistor, may be satisfactorily operated with the collector and emitter leads effectively interchanged whereby the collector functions as an emitter and the emitter functions as a collector. The applicant uses this peculiarity in a unique circuit, the operation of which will be explained with reference to FIG. 4. For simplification, the transistor load, which actually consists of motor 40 and capacitor 42, is shown as being purely resistive R. The load R may be placed on either side of the transistor 44, and is illustrated in FIG. 4 as connected between emitter 44' and a line 49 going to an AC voltage source. The opposite side of the AC voltage source is coupled through a line 50 to the collector 44'''.

In FIGS. 4A–4E, the voltage waveform $V_R$ across resistor R is shown for several values of bias applied between base 44'' and emitter 44'. In FIG. 4A, base 44'' is biased with sufficiently large negative voltage relative to the emitter 44' to cause the transistor 44 to be forward biased into saturation. During the first half cycle, line 49 goes positive relative to line 50, allowing transistor 44 to saturate in a normal manner and pass a positive half cycle of AC to resistor R (it being noted that a positive voltage on line 49 is defined in the drawing to produce a positive AC voltage $V_R$ across the load R). During the next half cycle, line 50 goes positive relative to line 49. Since the base 44'' remains negative relative to the collector 44''', the collector 44''' now serves as an emitter (with current flowing into the P material), and the transistor continues to conduct, as illustrated in FIG. 4A by the negative half cycle waveform. Accordingly, the transistor 44 passes both half cycles without modification.

If the forward bias is reduced in magnitude below the value necessary for saturation, transistor 44 does not saturate when line 49 goes positive. The resulting positive half cycle voltage waveform passed by the transistor, shown in FIG. 4B, has a lesser amplitude than the corresponding half cycle previously passed. However, transistor 44 still saturates when line 50 goes positive, since the positive voltage on collector 44''', which now serves as an effective emitter, causes the base-effective emitter junction to be forward biased by the total potential from the bias source. This is distinguished from the actual base-emitter junction, which because it is directly connected across the bias source, is held to the potential of the bias source. The voltage waveform, FIG. 4B, is an approximation of a reduced AC voltage component superimposed on a negative DC voltage component. By regulating the value of forward bias below the saturation value, any selected AC/DC ratio may be obtained.

Depending on the actual load R, the reduced amplitude positive half cycle waveform illustrated in FIG. 4B may have different shapes. For example, when connected to an inductive load, such as a motor winding, the voltage waveform may take the shape illustrated in dashed lines, or may take other waveform shapes in which the amplitude of one half cycle is reduced, without substantially affecting the other half cycle. This waveform transformation essentially introduces a DC component into the waveform, as previously noted. Depending upon the desired application, the DC component may be utilized, as in the motor control circuits disclosed herein, or may, if desired, be eliminated if it is desired to use only the AC gating properties of the circuit.

If the base 44″ of transistor 44 is given a slight positive bias in relation to the emitter 44′, as seen in FIG. 4C, the transistor 44 does not conduct during the positive half cylcle on line 49 because the actual emitter-base junction is back biased. During the next half cycle, line 50 goes positive relative to line 49. As the collector 44‴ to emitter 44′ voltage exceeds the value of bias voltage, collector 44‴, which now serves as an emitter, becomes more positive than the base 44″, thus forward biasing the transistor and causing it to conduct. In such a case, the transistor passes essentially all of the negative half cycle of AC to load R.

As the positive bias on the base 44″ of transistor 44 is increased in value, as seen in FIG. 4D, the transistor 44 does not saturate during the negative half cycle. The transistor, being forward biased during a lesser portion of the negative half cycle of AC, passes a reduced amplitude negative half cycle waveform to load R. Since only negative half cycles are passed in both FIGS. 4C and 4D, the load is gated at pulsating value of DC, having an average value directly dependent on the amount of bias to base 44″. By controlling the bias, the total amount of average DC passed to the load can be continously controlled.

If a positive bias having a level in excess of the peak magnitude voltage between lines 49, 50 is applied to base 44″, as seen in FIG. 4E, the transistor 44 is cut off at all times and no voltage is impressed across load R. While such a voltage of necessity is relatively high with respect to the voltage available from the AC source, very little power is used, insofar as only leakage current at the transistor junction is drawn.

Returning to FIG. 3, the principles described above cause a similar AC waveform to be applied across the load, herein motor winding 41. As lesser amounts of positive bias are coupled by servo control 26 to emitter 44′, the DC component introduced causes motor 40 to reduce its speed due to the braking effect of the DC voltage. Finally, when the one half cycle of AC is completely cut off, only a pulsating current flows through winding 41, and the motor 40 is braked to a halt.

The single transistor circuit of FIGS. 3 and 4 can be used in other motor control applications. For example, the collector and emitter electrodes of transistor 44 could be connected across the shading coil of a shaded pole motor. Such a connection will act to pass a lesser amplitude AC waveform coupled across the collector-emitter electrodes from the shading coil. This results in a lesser amount of turning torque being generated, as compared with placing a complete AC short across the shading coil. The transistor circuit thus can control motor speed by shorting only part of the amplitude of an AC waveform. In such a situtation, the DC component which is introduced can be disregarded. In the case of a shaded pole motor, the shading coils are too small for the DC to have much braking effect, and the actual speed control results from the amount of the AC waveform which is shorted. An example of such use of the transistor circuit is shown in a copending application of the applicant and Theodore E. Weichselbaum, entitled "Read Out System," filed on even date with the present application, and assigned to the same assignee as the present application, to which reference should be made for a further explanation.

In FIG. 5, a modified circuit using the principles of the circuit shown in FIGS. 3 and 4 is used to control both motor direction and motor speed. Specifically a two phase control motor 51 is used, which includes a first fiield winding 52 shunted by a capacitor 55. The field winding 52 is arranged to have the controled AC voltage applied thereacross. Motor 50 further includes a second field winding 54 connected to a source of alternating current which is shifted in phase with respect to the AC applied across winding 52.

One side of the first field winding 52 is connected to the center tap of a secondary coil 66 of a transformer 68. The primary coil 70 of the transformer 68 is connected to a suitable source of alternating current that is 90° out of phase with the alternating current applied to the second field winding 54. The second side of the first field winding 52 is connected to the collector c of first and second PNP transistors 72 and 74. The emitters e of the transistors 62 and 64 are connected to opposite ends of the secondary coil 66 of the transformer 68.

Each of the transistors 72 and 74 is adapted to have a bias applied directly across their respective base b and emitter e electrodes. Care should be observed when connecting a bias generating control to the transistors to preclude application of biases of magnitudes that would cause both transistors 72 and 74 to conduct simultaneously, which action could result in damage to the motor 51, the transistors 72 and 74, or the transformer 68.

In operation, when the transistor 72 is conducting in the manner described above with reference to FIGS. 3 and 4, the motor 51 will turn in one direction at a speed regulated by the direct current component introduced by the transistor 72, as determined by the bias applied thereto. The motor 51 may be braked in the same manner as the motor 40 of FIG. 3, by passing only one half cycle AC to winding 52. When the transistor 74 is conducting, the motor 51 will turn in the opopsite direction at a speed controlled by the bias applied to the transistor 74. The direction control is achieved by the arrangement of transistor 72 and 74 and the motor 51 with relation to the transformer 68 such that the AC component applied to the motor 51 through the transistor 72 is 180° out of phase with the AC component applied to the motor 51 through the transistor 74.

From the foregoing, it will be apparent that use of the principles of my invention provides a simple semi-conductor circuit for passing various amounts of AC and DC waveforms. This circuit has particular advantages when used to control the speed of an AC motor, however, the principles of the invention are equally usable in many other applications wherein control of an AC waveform is desirable, and the invention is not to be limited to motor speed control.

I claim:

1. A control circuit, comprising: a semiconductor device including first, second, and base electrodes, said first and second electrodes functioning as a collector and an emitter respectively when a voltage of one polarity is impressed thereacross and functioning as an emitter and a collector respectively when a voltage of opposite polarity is impressed thereacross; a source of AC waveform having opposite portions; an AC motor; network means including said AC motor and said AC source for coupling both portions of said AC voltage across said first and second electrodes, one portion causing said electrodes to respectively function as a collector and an emitter, and the other portion causing said electrodes to respectively function as an emitter and a collector; and bias means coupled between said base electrode and said network means for passing to said AC motor an AC waveform in which the amplitude of one portion of said AC waveform is continuously adjustable without affecting the amplitude of the other portion of said AC waveform, said bias means being adjustable to pass to said AC motor substantially all of said one portion of said AC waveform, and a varying amount of said other portion of said AC waveform in proportion to the amplitude of a bias voltage from said bias means, wherein the waveform flowing through said AC motor appears as a reduced amplitude AC waveform having a superimposed DC level, the reduced amplitude AC waveform driving said AC motor and the superimposed DC level braking said AC motor, whereby the amplitude of said bias voltage controls the speed of rotation of said AC motor.

2. A motor speed control system comprising: a bidirectional AC motor having a winding; a source of alternating current potential; a semiconductor device including at least first, second, and control electrodes; network means connecting said first and second electrodes, said winding, and said alternating current source in circuit; means coupled between said control electrode and said network means for applying a bias to said device to cause variable alternating current components to be applied to said winding, the speed of said motor being regulated by selectively varying the value of said bias, a second semiconductor device substantially similar to said first device, said network means connecting said first device and said second device between said winding and said source and coupling alternating current to said second device of different phase from the alternating current coupled to said first device, said AC motor rotating in an opposite direction when said alternating current of different phase flows through said winding, said bias means including a first bias portion for controlling said first device to vary the speed of said motor in one direction and a second bias portion for controlling said second device to vary the speed of said motor in the opposite direction.

3. A motor speed control system comprising:
a bidirectional AC motor having winding means through which flows alternating current of one phase when the motor rotates in one direction and alternating current of another phase when the motor rotates in an opposite direction;
a first semiconductor device and a second semiconductor device each including at least first, second and control electrodes;
first network means connecting said first and second electrodes of said first semiconductor device across said winding means to control the flow of said alternating current of one phase;
second network means connecting said first and second electrodes of said second semiconductor device across said winding means to control the flow of said alternating current of another phase; and
bias means coupled between said control electrodes and said network means for applying bias to said devices to control the phase of the alternating current which flows through said winding means, the speed and direction of rotation of said motor being regulated by selectively varying the value of said biases.

4. The motor speed control system of claim 3 wherein said bias means is adjustable to cause said semiconductor devices to pass, for the phase of alternating current associated therewith, substantially all of one half cycle of said alternating current and a varying amount of the opposite half cycle of said alternating current in proportion to the amplitude of the bias, wherein the alternating current flowing through said winding means appears as a reduced amplitude alternating current waveform having a superimposed direction current level.

5. A motor speed control system comprising:
an AC motor having a winding;
a semiconductor device including first, second, and base electrodes, said first and second electrodes functioning as a collector and an emitter respectively when a voltage of one polarity is impressed thereacross and functioning as an emitter and a collector respectively when a voltage of opposite polarity is impressed thereacross;
a source of AV voltage having opposite polarity portions;
network means including said winding and said AC source for coupling both portions of said AC voltage across said first and second electrodes, one portion causing said electrodes to respectively function as a collector and an emitter, and the other portion causing said electrodes to respectively function as an emitter and a collector; and
bias means coupled between said base electrode and said network means for passing to said winding a varying amount of one of said polarity portions of said AC voltage in order to introduce a DC level which contributes a braking component, the amplitude of said varying amount controlling the speed of rotation of said AC motor.

References Cited

UNITED STATES PATENTS

| | | | |
|---|---|---|---|
| 3,066,258 | 11/1862 | Overbeer et al. | 307—249 XR |
| 3,166,701 | 1/1965 | Bohn | 318—212 |
| 3,281,633 | 10/1966 | Jensen | 318—212 |
| 3,324,372 | 6/1967 | Myers | 318—227 |
| 3,384,801 | 5/1968 | Rodgers | 318—227 XR |
| 3,389,315 | 6/1968 | Andreas et al. | 318—227 XR |

ORIS L. RADER, Primary Examiner

G. Z. RUBINSON, Assistant Examiner

U.S. Cl. X.R.

318—18, 207, 212, 227, 269